Patented Dec. 13, 1932

1,890,491

UNITED STATES PATENT OFFICE

FRIEDRICH BERGIUS, FRIEDRICH KOCH, AND EDUARD FAERBER, OF HEIDELBERG, GERMANY, ASSIGNORS TO THE FIRM HOLZHYDROLYSE AKTIENGESELLSCHAFT, OF HEIDELBERG, GERMANY

CONSOLIDATED LIGNIN AND METHOD OF PRODUCING THE SAME

No Drawing. Application filed January 25, 1930, Serial No. 423,566, and in Germany January 23, 1929.

We have filed applications in Germany on January 23 and November 27, 1929, no patents having been granted on either of said German applications.

In the hydrolysis of wood and other vegetable substances by acid, more particularly hydrochloric acid in high concentration, as for example by following the process of the Hägglund Patent No. 1,544,149 of June 30, 1925 there is obtained, as the residue of said process, an acid-proof porous material chiefly consisting of lignin, said lignin being for practical purposes pure lignin which, having resisted the attack of highly concentrated hydrochloric acid, is insoluble therein and is hydrochloric-acid-proof. This lignin residue is quite brittle and exhibits no tendency of any capacity of the particles to cling together. Although limited uses for this material have been found (as in United States Patent to Marcel Levy No. 1,615,091), the material, speaking generally, represents a waste by-product, useless for any ordinary purposes.

The present invention has for its object to manufacture useful products from such lignin residue and we accomplish this end by moulding it under pressure, such moulding operation resulting in the manufacture of coherent pieces of desired shape owing to the unexpected property of the said residue developed under pressure conditions in the mold to come to a fairly strong cohesion on compression without it being necessary to add any further binding substances.

Owing to this natural but concealed property of the waste product in question the moulding under pressure results in the formation of coherent pieces of desired shape which retain the molded shape by a self-binding property of the lignin material and does not require for the molding operation or for the subsequent cohesion of the molded product the presence of any added binding agent. The molded products accordingly possess a great value in double regard: (1) as fuel briquettes having a higher heating value than brown coal briquettes and being distinguished by being clean in handling and easy to ignite; and (2) as a building material whether for the chemical industry in the form of acid-proof vessels or linings, or for other building purposes, for instance as flooring or wall covering or as building material with good insulating properties.

If desired, the compressed pieces may be submitted to carbonization. Notwithstanding the carbonization treatment the solid condition of the briquette is maintained to a very great extent, and a compact carbon is produced which burns without flame and practically without smoke like good charcoal, from which this carbon differs also by the fact that owing to its compact structure, it falls to pieces less easily and therefore allows of a greater pressure, which is an advantage for instance when using it for metallurgical purposes.

In briquetting the lignin waste material according to the present invention, it can be mixed with auxiliary substances which assist the purposes for which the mouldings are intended: for instance in the manufacture of briquettes for fuel, it can be mixed with fine coal, or in the manufacture of building materials with suitable filling substances such as are already otherwise used for the manufacture of moulded bodies for building purposes. It is remarkable that the binding property possessed by the lignin mass renders it possible to bind at the same time material quantities of auxiliary substances lacking in binding property.

What we claim is:

1. The process which comprises pressing in a mold particles of dry, granular, porous brittle deacidified substantially pure lignin residue of hydrolyzing vegetable material with hydrochloric acid of high concentration, said particles being in a condition where they exhibit no capability of clinging together, until such interaction occurs between the particles in the mold that upon release of the pressure and removal from the mold the lignin material will retain the molded shape by self-sustainment, not requiring the presence of any added binding agent.

2. The process which comprises pressing in a mold particles of dry, granular, porous brittle deacidified substantially pure lignin residue of hydrolyzing vegetable material with hydrochloric acid of high concentration, said particles being in a condition where they exhibit no capability of clinging together, until such interaction occurs between the particles in the mold that upon release of the pressure and removal from the mold the lignin material will retain the molded shape by self-sustainment, not requiring the presence of any added binding agent, and subjecting the thus molded products to carbonization.

3. The process which comprises introducing into a mold under exclusion of added agents having binding capacity particles of dry, granular, porous brittle deacidified substantially pure lignin residue of hydrolyzing vegetable material with hydrochloric acid of high concentration, while said particles are in a condition where they exhibit no capability of clinging together, and applying pressure until such interaction occurs between the particles in the mold that upon release of the pressure and removal from the mold the lignin material will retain the molded shape by self-sustainment, not requiring the presence of any added binding agent.

4. The process which comprises introducing into a mold agents of non-binding properties adapted to aid in the predetermined use of the molded products, and, in admixture therewith, particles of dry, granular, porous brittle deacidified substantially pure lignin residue of hydrolyzing vegetable material with hydrochloric acid of high concentration, while said particles are in a condition where they exhibit no capability of clinging together, and applying pressure until such interaction occurs between the lignin particles in the mold that upon release of the pressure and removal from the mold the lignin material will retain the molded shape and hold the agents of non-binding properties by self-sustainment of the lignin material, not requiring the presence of any added binding agent.

5. The process which comprises introducing into a mold particles of coal and, in admixture therewith, particles of dry, granular, porous brittle deacidified substantially pure lignin residue of hydrolyzing vegetable material with hydrochloric acid of high concentration, while said particles are in a condition where they exhibit no capability of clinging together, applying pressure until such interaction occurs between the lignin particles in the mold that upon release of the pressure and removal from the mold the lignin material will retain the molded shape and hold the coal particles by self-sustainment of the lignin material, not requiring the presence of any added binding agent.

6. The product which comprises, in the form of mold-compressed, coherent units, consolidated, dry, granular, porous brittle particles of substantially pure lignin, being the deacidified residue of hydrolyzing vegetable material with hydrochloric acid of high concentration, said particles in the natural condition exhibiting no capability of clinging together, but exhibiting in the molded state such interaction between the particles that the lignin material retains the consolidated shape by self-sustainment, not requiring the presence of any added binding agent.

7. The product which comprises, in the form of mold-compressed, coherent units consisting of the carbonized products of consolidated, dry, granular, porous brittle particles of substantially pure lignin, being the deacidified residue of hydrolyzing vegetable material with hydrochloric acid of high concentration, said particles in the natural condition exhibiting no capability of clinging together, but exhibiting in the consolidated state such interaction between the particles that the lignin material retains in its carbonized state the molded shape by self-sustainment, not requiring the presence of any added binding agent.

In testimony whereof, we affix our signatures.

FRIEDRICH BERGIUS.
FRIEDRICH (FRITZ) KOCH.
EDUARD FAERBER.